(12) United States Patent
Huang et al.

(10) Patent No.: US 11,156,271 B2
(45) Date of Patent: Oct. 26, 2021

(54) POWER UNIT FOR BIONIC ROBOT, ROBOT JOINT, AND ROBOT

(71) Applicant: Beijing Institute of Technology, Beijing (CN)

(72) Inventors: Qiang Huang, Beijing (CN); Xuxiao Fan, Beijing (CN); Richeng Huang, Beijing (CN); Zhangguo Yu, Beijing (CN); Qiang Chen, Beijing (CN); Chenglong Tang, Beijing (CN)

(73) Assignee: BEIJING INSTITUTE OF TECHNOLOGY, Beijing (CN)

( * ) Notice: Subject to any disclaimer, the term of this patent is extended or adjusted under 35 U.S.C. 154(b) by 0 days.

(21) Appl. No.: 16/889,295

(22) Filed: Jun. 1, 2020

(65) Prior Publication Data
US 2020/0378476 A1      Dec. 3, 2020

(30) Foreign Application Priority Data
May 30, 2019   (CN) .......................... 201910466685.1

(51) Int. Cl.
*F16H 3/70*        (2006.01)
*B25J 9/12*        (2006.01)
(Continued)

(52) U.S. Cl.
CPC ................ *F16H 3/70* (2013.01); *B25J 9/126* (2013.01); *F16D 23/02* (2013.01); *F16H 63/304* (2013.01);
(Continued)

(58) Field of Classification Search
CPC ........ F16H 3/70; F16H 3/54; F16H 2037/045; F16H 37/043; F16H 2200/2005;
(Continued)

(56) References Cited

U.S. PATENT DOCUMENTS 7,086,515 B2 *   8/2006   Kelley, Jr. ............... F16D 23/04
                                                     192/48.3
10,292,838 B2 *  5/2019   Evans ....................... A61F 2/54
(Continued)

FOREIGN PATENT DOCUMENTS

CN          107035822        8/2017
CN          107627830        1/2018
(Continued)

OTHER PUBLICATIONS

First Office Action and Search report, dated Apr. 30, 2020 in the corresponding Chinese patent application No. 201910466685.1, 29 pages.

*Primary Examiner* — Roger L Pang
(74) *Attorney, Agent, or Firm* — Hamre, Schumann, Mueller & Larson, P.C.

(57) ABSTRACT

The present disclosure provides a power unit for a bionic robot, a robot joint and a robot. The power unit comprises: a shell, wherein a stator is embedded in the shell, a rotor is embedded in the stator, a rotor shaft is embedded in the rotor, bearings are disposed between the rotor shaft and the shell, a driving shaft is embedded in a central portion of the rotor shaft, a first driving wheel is disposed on the driving shaft, two transmission shafts are disposed in the rotor shaft, a first driven wheel and second driving wheels are disposed on each of the transmission shafts, the first driven wheel is engaged with the first driving wheel, a sun gear shaft is disposed in the rotor shaft, the sun gear shaft and the driving shaft are coaxially disposed, and a synchronizer and second driven wheels are disposed on the sun gear shaft.

19 Claims, 4 Drawing Sheets

(51) Int. Cl.
*F16D 23/02* (2006.01)
*F16H 63/30* (2006.01)
*H02K 7/08* (2006.01)
*H02K 7/108* (2006.01)
*H02K 7/116* (2006.01)
*F16H 37/04* (2006.01)
*F16H 37/08* (2006.01)
*F16H 3/44* (2006.01)

(52) U.S. Cl.
CPC ............ *H02K 7/083* (2013.01); *H02K 7/108* (2013.01); *H02K 7/116* (2013.01); *F16H 37/0833* (2013.01); *F16H 2003/445* (2013.01); *F16H 2037/047* (2013.01); *F16H 2037/048* (2013.01); *F16H 2063/3093* (2013.01); *F16H 2200/2094* (2013.01)

(58) Field of Classification Search
CPC ............ F16H 3063/3093; F16H 3/097; F16H 2003/445; F16H 2200/2094; F16H 37/0833; F16H 37/046; F16H 2037/047; F16H 2037/048; F16H 2063/3093; F16H 2200/2035; F16H 3/58; F16H 2200/0034; F16H 57/021; F16H 57/023; F16D 2011/001; F16D 2011/23; F16D 23/02; H02K 7/083; H02K 7/108; H02K 7/116

USPC ........................ 475/149, 207, 218; 74/331
See application file for complete search history.

(56) References Cited

U.S. PATENT DOCUMENTS

| | | |
|---|---|---|
| 2012/0176007 A1 | 7/2012 | Takeuchi |
| 2013/0049439 A1 | 2/2013 | Yamada et al. |
| 2019/0032753 A1* | 1/2019 | Chimner ................. F16D 21/04 |
| 2019/0178361 A1* | 6/2019 | Cho ........................ F16H 48/36 |
| 2019/0383372 A1* | 12/2019 | Jackson ................. F16H 3/095 |
| 2020/0003113 A1* | 1/2020 | Hrusch .................... F02B 67/06 |
| 2020/0039094 A1* | 2/2020 | Ayuzawa ............. F16D 63/006 |
| 2020/0069441 A1* | 3/2020 | Larose ...................... A61F 2/70 |
| 2020/0352811 A1* | 11/2020 | Varghese ................ B25J 9/1633 |

FOREIGN PATENT DOCUMENTS

| | | | |
|---|---|---|---|
| CN | 207145546 | 3/2018 | |
| CN | 108312824 | 7/2018 | |
| CN | 109572415 | 4/2019 | |
| DE | 102012218367 A1 * | 4/2014 | ............... F16H 3/62 |
| GB | 341379 | 1/1931 | |

* cited by examiner

POWER UNIT FOR BIONIC ROBOT, ROBOT JOINT, AND ROBOT

TECHNICAL FIELD

The present disclosure relates to the technical field of bionic robots, and particularly to a power unit for a bionic robot, a robot joint and a robot.

BACKGROUND ART

The motor used at a hip joint of a bionic robot generally has only one gear ratio, but at present, the requirements for the bionic robot are being capable of running, jumping, climbing, and low power consumption long endurance walking, and the speed ratio requirements for the reducer assembly are varied under different working conditions, so the reducer of the motor of the bionic robot needs to have different gear ratios to meet the uses of the bionic robot.

In addition, in the prior art, a lightweight design of the bionic robot should be fully made in order to obtain a better dynamic performance, and its volume must be small. However, the gearboxes in the traditional reducer industry, such as the automobile reducer or the gearbox in the machining industry, are generally too large to be used on the bionic robot. In addition, the shifting actuator of the traditional reducer gear mostly adopts motor driving, hydraulic driving or multi-plate clutch type, which further increases the overall weight and volume, and also requires other power sources for supplying power. Therefore, transplantation cannot be performed by directly using a proportional reduction manner to install on the bionic robot.

SUMMARY OF THE DISCLOSURE

An objective of the present disclosure is to provide a power unit for a bionic robot to achieve an adjustable variable speed ratio at a robot joint.

In an aspect of the present disclosure, there is provided a power unit for a bionic robot, comprising: a motor shell, wherein a motor stator is embedded in the motor shell, a motor rotor is embedded in the motor stator, a motor rotor shaft is embedded in the motor rotor, bearings are disposed between the motor rotor shaft and the motor shell, a driving shaft is embedded in a central portion of the motor rotor shaft, a first driving wheel is disposed on the driving shaft, two transmission shafts are disposed in the motor rotor shaft, a first driven wheel and second driving wheels are disposed on each of the transmission shafts, the first driven wheel is engaged with the first driving wheel, a sun gear shaft is further disposed in the motor rotor shaft, the sun gear shaft and the driving shaft are coaxially disposed, a synchronizer and second driven wheels are disposed on the sun gear shaft, the second driven wheels are engaged with the second driving wheels, and a planetary gear set is further disposed on the sun gear shaft.

The second driving wheels comprise a first gear driving wheel and a second gear driving wheel, the second driven wheels comprises a first gear driven wheel and a second gear driven wheel, the first gear driving wheel is engaged with the first gear driven wheel, the second gear driving wheel is engaged with the second gear driven wheel, and the synchronizer is disposed in the motor rotor shaft and between the second gear driven wheel and the first gear driven wheel, for a selective kinetic connection with the second gear driven wheel or the first gear driven wheel to achieve a synchronous movement with the second gear driven wheel or the first gear driven wheel; the synchronizer is in a splined connection with the sun gear shaft.

In some embodiments of the present disclosure, in a state where the synchronizer is in kinetic connection with the first gear driven wheel, an output gear of the power unit is a first gear; and in a state where the synchronizer is in kinetic connection with the second gear driven wheel, an output gear of the power unit is a second gear.

In some embodiments of the present disclosure, a second needle roller bearing is disposed between the second gear driven wheel and the sun gear shaft, and a first needle roller bearing is disposed between the first gear driven wheel and the sun gear shaft.

In some embodiments of the present disclosure, the synchronizer comprises a splined hub sleeved on the sun gear shaft, the splined hub is sleeved with an engaging sleeve, a locating pin is disposed between the engaging sleeve and the splined hub, second gear locking conical teeth and first gear locking conical teeth are symmetrically disposed on left and right sides of the splined hub, the second gear locking conical teeth are sleeved with a second gear locking ring, and the first gear locking conical teeth is sleeved with a first gear locking ring.

In some embodiments of the present disclosure, rectangular splines are disposed through side surfaces of the splined hub.

In some embodiments of the present disclosure, guide angles are provided on the second gear locking conical tooth, the second gear locking ring, the first gear locking conical tooth, and the first gear locking ring.

In some embodiments of the present disclosure, a shift fork is disposed on the engaging sleeve, and a second gear magnetic unit and a first gear magnetic unit are symmetrically disposed on left and right sides of the shift fork.

In another aspect of the present disclosure, there is provided a robot joint comprising the above power unit.

In still another aspect of the present disclosure, there is provided a robot comprising the above robot joint.

The power unit for a bionic robot according to the embodiments of the present disclosure realizes a variable gear ratio of a reducer on a joint of the bionic robot, so that a rotational speed output from the reducer can be changed.

BRIEF DESCRIPTION OF THE DRAWINGS

FIG. 2 is a schematic structural diagram after FIG. 1 is rotated for 90 degrees clockwise;

In which,

| 1: motor shell; | 2: motor stator; | 3: motor rotor; |
|---|---|---|
| 4: motor rotor shaft; | 5: first driving wheel; | 6: first driven wheel; |
| 7: second gear driving wheel; | 8: synchronizer; | 8-1: second gear locking conical tooth; |
| 8-2: second gear locking ring; | 8-3: engaging sleeve; | 8-4: locating pin; |
| 8-5: splined hub; | 8-6: first gear locking ring; | 8-7: first gear locking conical tooth; |
| 8-8: rectangular spline; | 8-9: guide angle; | 9: first gear driving wheel; |

-continued

| 10: sun gear shaft; | 11: planetary gear set; | 12: second gear driven wheel; |
|---|---|---|
| 13: second needle roller bearing; | 14: first gear driven wheel; | 15: first needle roller bearing; |
| 16: second gear magnetic unit; | 17: shift fork; | 18: first gear magnetic unit. |

DETAILED DESCRIPTION OF THE PREFERRED EMBODIMENT

Next, the present disclosure will be described in detail with reference to the drawings.

Embodiment

Figure 1:
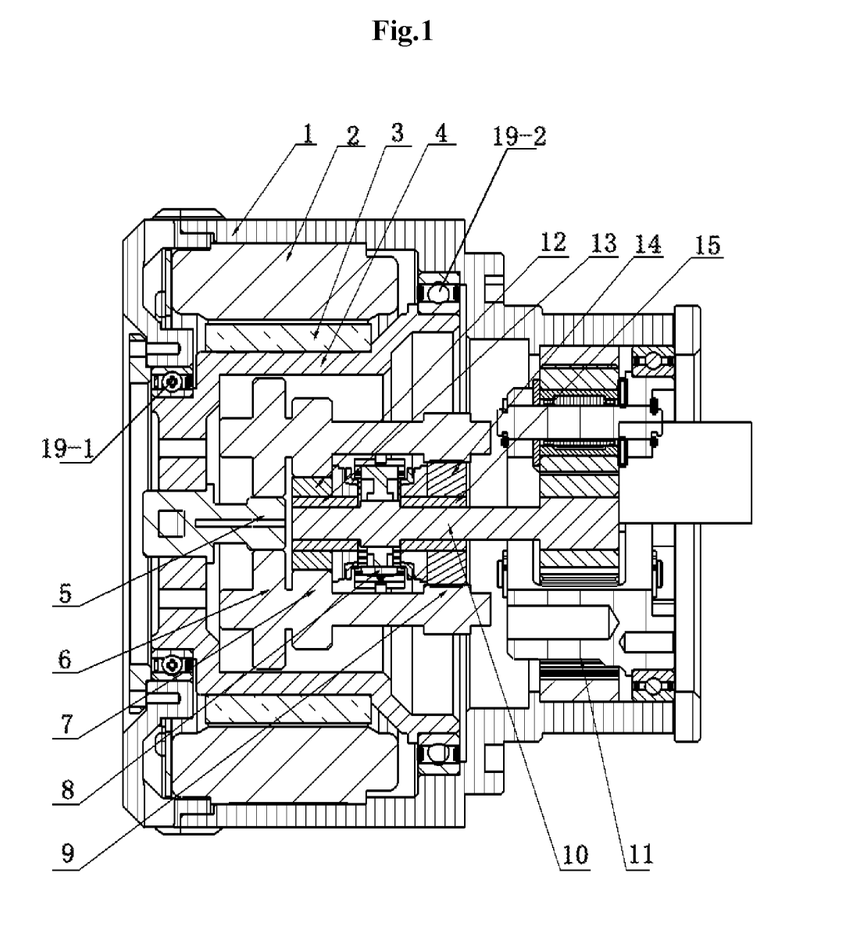
FIG. 1 is a schematic structural diagram of the power unit for a bionic robot of the present disclosure.

The present disclosure provides a variable speed ratio power unit for a bionic robot as illustrated in FIG. 1, comprising: a motor shell 1, wherein a motor stator 2 is embedded in the motor shell 1, a motor rotor 3 is embedded in the motor stator 2, a motor rotor shaft 4 is embedded in the motor rotor 3, and bearings 19-1 and 19-2 are disposed between the motor rotor shaft 4 and the motor shell 1. As an example, the power unit may be in the form of a frameless motor. Compared with a framed motor of the same size, it can provide a larger power density ratio and a greater torque. Of course, the embodiments of the present disclosure are not limited to the frameless motor, and a reduced frame motor or a framed motor is also possible.

The motor stator 2 may be in a fixed connection, such as a bolt connection, with the fixed motor shell 1; and the motor rotor 3 is in a fixed connection, such as a bolt connection, an interference fit or a key connection, etc., with the motor rotor shaft 4, so that the motor rotor 3 can drive the motor rotor shaft 4 to rotate.

In some embodiments, the motor rotor shaft 4 may be in the form of a sleeve shaft, and a hollow portion in the middle forms a chamber that accommodates a variable speed transmission structure. In the example illustrated in FIG. 1, the motor rotor shaft 4 may be divided into different shaft segments with different outer diameters, such as a small-diameter shaft segment, a middle-diameter shaft segment, and a large-diameter shaft segment. Bearings 19-1 and 19-2 are installed on outer peripheries of the small-diameter shaft segment and the large-diameter shaft segment, respectively; and the middle-diameter shaft segment is in a fixed connection with the motor rotor 3. The end of the large-diameter shaft segment of the motor rotor shaft 4 is open to install the variable speed transmission structure; and a central portion of the small-diameter shaft segment of the motor rotor shaft 4 is fixedly connected with a driving shaft, so that the motor rotor shaft and the driving shaft rotate simultaneously.

The driving shaft is embedded in the central portion of the motor rotor shaft 4, and a first driving wheel 5 is disposed on the driving shaft. Two transmission shafts are disposed in the motor rotor shaft 4, a first driven wheel 6 and second driving wheels are disposed on each transmission shaft, and the first driven wheel 6 is engaged with the first driving wheel 5. A sun gear shaft 10 is further disposed in the motor rotor shaft 4, the sun gear shaft 10 and the driving shaft are coaxially disposed. A synchronizer 8 and second driven wheels are disposed on the sun gear shaft 10, the second driven wheels are engaged with the second driving wheels. A planetary gear set 11 is further disposed on the sun gear shaft 10. As illustrated in FIG. 1, the second driving wheels comprise a first gear driving wheel 9 and a second gear driving wheel 7, and the second driven wheels comprise a first gear driven wheel 14 and a second gear driven wheel 12. The first gear driving wheel 9 is engaged with the first gear driven wheel 14, the second gear driving wheel 7 is engaged with the second gear driven wheel 12, and the synchronizer 8 is disposed between the second gear driven wheel 12 and the first gear driven wheel 14. The second driving wheels and the second driven wheels are both provided with a first gear wheel and a second gear wheel, so that the present disclosure has the effects of variable speed adjustment and gear shifting. After the power unit of the present disclosure is installed on a joint portion of the bionic robot, in a case where the bionic robot needs to work with a large torque, it may be shifted to the second gear, and in a case where the bionic robot needs to walk at a high speed, it may be shifted to the first gear, so that the gear ratio is changed and then the output rotational speed of the planetary gear set 11 is changed, thereby better utilizing the power unit of the present disclosure with high-efficiency, and sufficiently utilizing the output power of the present disclosure.

In the above embodiment, three gear structures, i.e., the first driven wheel 6, the second gear driving wheel 7 and the first gear driving wheel 9, are sequentially machined or installed on each transmission shaft. The three gear structures may be formed integrally with the transmission shaft, or be gears assembled later.

In the example illustrated in FIG. 1, two transmission shafts are disposed in the motor rotor shaft 4, and the first driven wheel and the second driving wheels on each of the transmission shafts engage with the first driving wheel and the corresponding second driven wheels, respectively, to form two transmission paths for power dividing. That is, for each of the transmission shafts, the first driven wheel 6 engages with the first driving wheel 5, the second gear driving wheel 7 engages with the corresponding second gear driven wheel 12, and the first gear driving wheel 9 engages with the corresponding first gear driven wheel 14. By adopting the power dividing, the power from the driving shaft is transmitted by the two transmission shafts together, and then is converged to a sun gear shaft, so that a small space can be used to achieve a variable speed output of high power, thereby maintaining a power output capability while reducing a volume of the reducer. The power unit provided by the embodiment of the present disclosure has the advantages that the overall structure is compact, the occupied space is small, and weight of the joint transmission structure is light. In other embodiments of the present disclosure, the number of the transmission shafts is not limited to two, and may be designed to be more, such as 3 or 4.

The power unit of the embodiment of the present disclosure can be used for a motor of a joint of a bionic robot, which is not only simple and compact in structure, but also small in size and light in weight, which is beneficial for the bionic robot to obtain a better dynamic performance.

In addition, as illustrated in FIG. 1, a second needle roller bearing 13 may be disposed between the second gear driven wheel 12 and the sun gear shaft 10, and a first needle roller bearing 15 is disposed between the first gear driven wheel 14 and the sun gear shaft 10. By using the first needle roller bearing 15 and the second needle roller bearing 13, the distances from the sun gear shaft 10 to the second gear driven wheel 12 and the first gear driven wheel 14 can be effectively decreased so that the structure is more compact. Meanwhile, the first needle roller bearing 15 and the second needle roller bearing 13 have a larger load bearing capacity than the ball bearing, and they are suitable for a support structure with a limited radial installation size, while achieving the effect of prolonging the service life of parts. In this embodiment, the second gear driven wheel 12 and the first gear driven wheel 14 are both in a normal rotation state during working. Only when the synchronizer 8 cooperates with one of the driven wheels can power be transmitted to the sun gear shaft 10. The needle roller bearings help to increase the transmission efficiency and reduce the energy loss.

Figure 3:
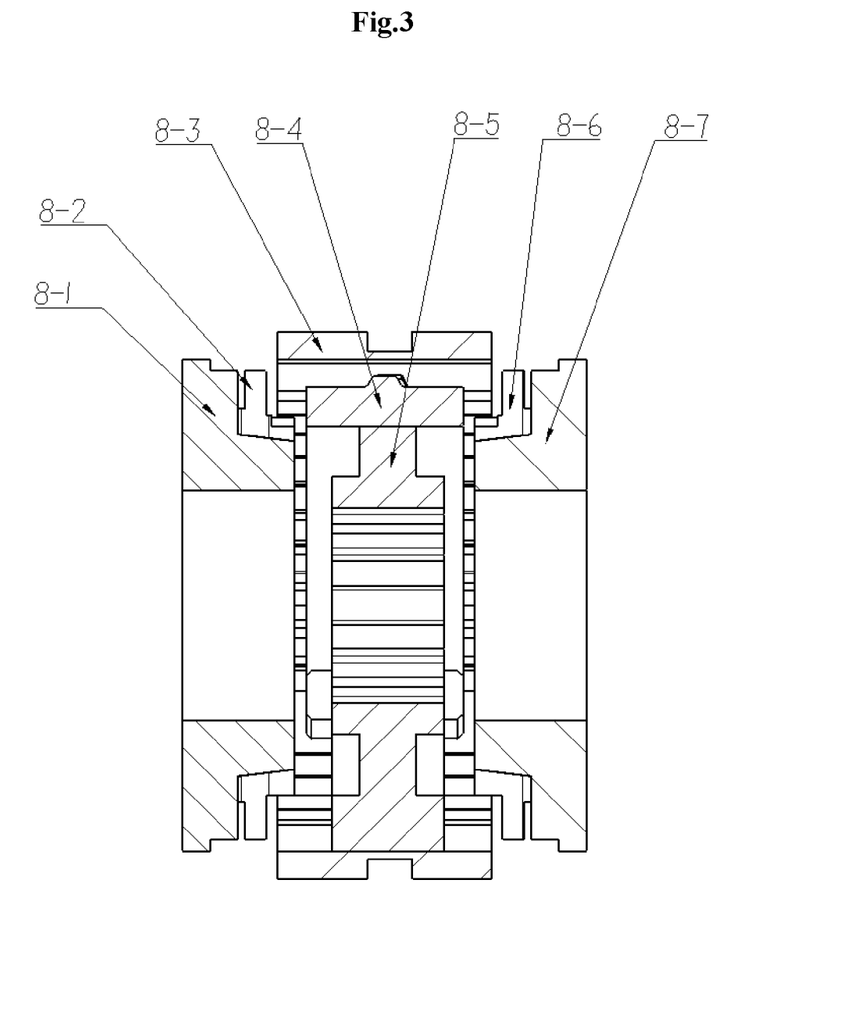
FIG. 3 is a front view of a synchronizer of the present disclosure.

In addition, as illustrated in FIG. 3, the synchronizer 8 comprises a splined hub 8-5 sleeved on the sun gear shaft 10. The splined hub 8-5 is sleeved with an engaging sleeve 8-3, a locating pin 8-4 (or slide block) is disposed between the engaging sleeve 8-3 and the splined hub 8-5. Second gear locking conical teeth 8-1 and first gear locking conical teeth 8-7 are symmetrically disposed on left and right sides of the splined hub 8-5. Here, the second gear locking conical tooth 8-1 is a tooth structure of the second gear driven wheel 12, and the first gear locking conical tooth 8-7 is a tooth structure of the first gear driven wheel 14. The second gear locking conical teeth 8-1 are sleeved with a second gear locking ring 8-2, and the first gear locking conical teeth 8-7 is sleeved with a first gear locking ring 8-6. When the second gear locking conical tooth 8-1 are engaged with the second gear driven wheel 12, the power unit is in a second gear state, and when the first gear locking conical tooth 8-7 is engaged with the first gear driven wheel 14, the power unit is in a first gear state. The synchronizer 8 can perform gear shifting rapidly, thereby shortening the shifting time, and making the shifting process more stable.

Figure 4:
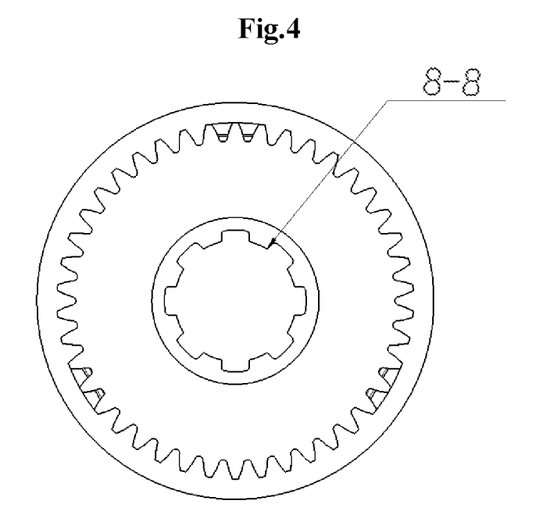
FIG. 4 is a right view of a synchronizer of the present disclosure.

An inner peripheral surface of a middle hole of the splined hub 8-5 has an internal spline, an outer peripheral surface of the sun gear shaft 10 has an external spline, and the splined hub 8-5 and the sun gear shaft 10 are in a splined connection to maintain a synchronous rotation. The outer peripheral surface of the splined hub 8-5 has an external spline, the inner peripheral surface of the engaging sleeve 8-3 has an internal spline, and the splined hub 8-5 and the engaging sleeve 8-3 are in a splined connection to maintain a synchronous rotation. As illustrated in FIG. 4, rectangular splines 8-8 are set through the inner peripheral surface of the middle hole of the splined hub 8-5, which increases the contact area between the splined hub 8-5 and the sun gear shaft 10, while the supporting points between the splined hub 8-5 and the sun gear shaft 10 are increased, so that when one supporting point is damaged, there are still a plurality of other supporting points to maintain the normal transfer of the rotational speed between the splined hub 8-5 and the sun gear shaft 10, thereby keeping the normal operation of the power unit.

The locating pin or slide block 8-4 may be installed, for example, in a plurality of (such as three) through-grooves disposed uniformly on an outer periphery of the splined hub 8-5. The outside of the locating pin (or slide block) 8-4 has a convex portion, and an inner peripheral surface of the engaging sleeve 8-3 has a concave portion corresponding to the convex portion, so that when sliding axially, the engaging sleeve 8-3 can cause the locating pin (or slide block) 8-4 to also slide axially. A shift fork 17 is disposed on the engaging sleeve 8-3, and a ring groove fitted with the shifting fork 17 is machined on an outer cylindrical surface of the engaging sleeve 8-3, and the shift fork 17 can cause the engaging sleeve 8-3 to slide axially along the splined hub 8-5.

The second gear locking ring 8-2 and the first gear locking ring 8-6 are disposed on left and right sides of the splined hub 8-5, respectively, and each provided with a notch for inserting the locating pin (or slide block) 8-4, so as to lock the locating pin (or slide block) 8-4.

The inner peripheral surfaces of the two locking rings are inner conical surfaces, and the locking conical teeth of the second gear driven wheel 12 or the first gear driven wheel 14 fitted therewith are set as outer conical surfaces, and they contact each other through the conical surfaces to form a conical surface friction pair. Through the friction of the friction pair, the locking rings and the second gear driven wheel 12 or the first gear driven wheel 14, which have different rotational speeds, can quickly achieve synchronous rotation before connection. After the synchronous rotation is achieved, the external spline of the ring segment of the locking ring is coupled with the internal spline of the engaging sleeve 8-3 to stably transmit power. Since the application of the locking ring in the synchronizer can be implemented with the prior art, it will not be described in detail here.

Figure 5:
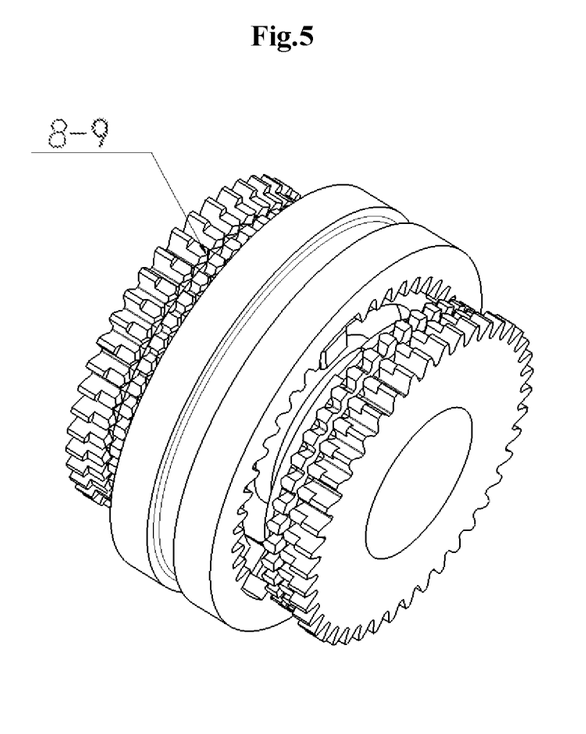
FIG. 5 is a schematic structural diagram of a synchronizer of the present disclosure.

As illustrated in FIGS. 3 and 5, guide angles 8-9 are provided on the second gear locking conical tooth 8-1, the second gear locking ring 8-2, the first gear locking conical tooth 8-7, and the first gear locking ring 8-6. The guide angle 8-9 is designed so that the engaging sleeve 8-3 is guided when being connected with the second gear locking ring 8-2 or the first gear locking ring 8-6, which achieves a smoother connection, and prevents a potential safety hazard caused by a collision between the engaging sleeve 8-3 and the second gear locking ring 8-2 or the first gear locking ring 8-6, thereby achieving the effects of smooth gear shifting and improved safety.

Figure 2:
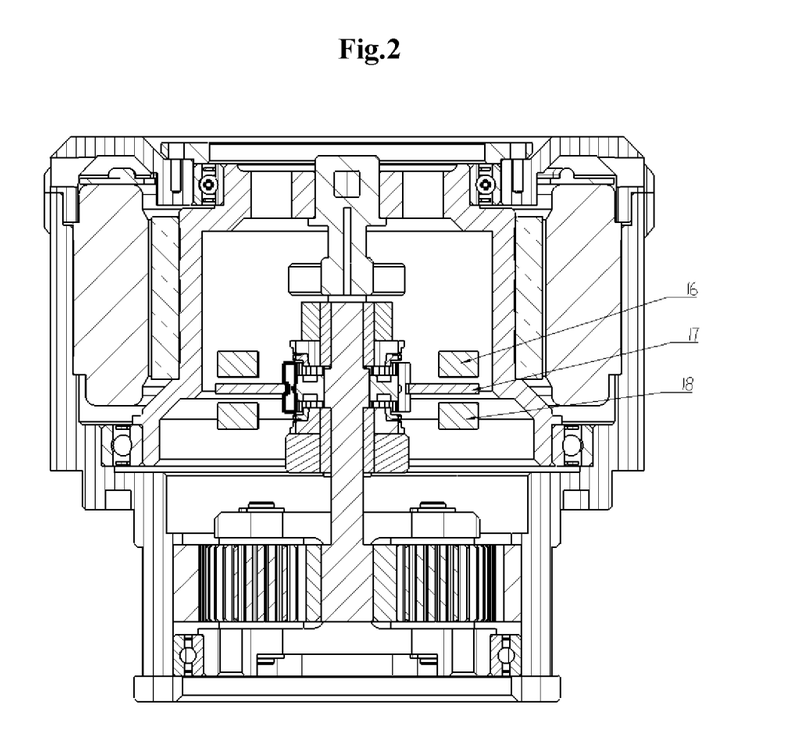

As illustrated in FIG. 2, the shift fork 17 is disposed on the engaging sleeve 8-3, and a second gear magnetic unit 16 and a first gear magnetic unit 18 are symmetrically disposed on left and right sides of the shift fork 17. The main function of the shift fork 17 is to drag the engaging sleeve 8-3 to achieve the gear shifting, while the second gear magnetic unit 16 and the first gear magnetic unit 18 can attract the shift fork 17 when being energized, and the shift fork 17 drags the engaging sleeve 8-3 to move after being attracted, so that no external force is required during the gear shifting, and the power unit has the effect of automatic gear shifting.

The working process of the embodiment of the present disclosure:

After the power unit is powered on, the motor rotor 3 and the motor rotor shaft 4 rotate to cause the driving shaft to rotate; the driving shaft causes the first driving wheel 5 to rotate; the first driving wheel 5 causes the first driven wheel 6, the second gear driving wheel 7 and the first gear driving wheel 9 to rotate; and the second gear driving wheel 7 and the first gear driving wheel 9 cause the second gear driven wheel 12 and first gear driven wheel 14 to rotate, respectively. The shift fork 17 of the synchronizer 8 is at an intermediate position in an initialized state. Due to the presence of the synchronizer 8, the sun gear shaft 10 does not rotate at this time; the second gear driven wheel 12 and the first gear driven wheel 14 are in an idling state, and the power unit is in a zero gear state. Next, if the second gear magnetic unit 16 is electrified, a magnetic force is generated on the second gear magnetic unit 16, the shift fork 17 is attracted to move towards the second gear magnetic unit 16, and the shift fork 17 drags the engaging sleeve 8-3 to move towards the second gear driving wheel 7 and the second gear driven wheel 12. The engaging sleeve 8-3 gradually connects with the second gear locking ring 8-2 when being moved. After the second gear locking conical tooth 8-1 is connected with the second driven wheels 12, the second locking conical tooth 8-1 obtains a same rotational speed as the second gear driven wheel 12, and there is a friction conical surface between the second gear locking conical tooth 8-1 and the second gear locking ring 8-2. During the gradual connection between the engaging sleeve 8-3 and the second gear locking ring 8-2, the connection between the second gear locking conical tooth 8-1 and the second gear locking ring 8-2 is gradually tight due to a pulling force of the second gear magnetic unit 16 on the shift fork 17, so that the second gear locking ring 8-2 speeding up rotation till its rotational speed is the same as that of the second gear locking conical tooth 8-1. In this process, the engaging sleeve 8-3 and the locking ring 8-2 rotate synchronously due to a friction force and gradually reach the same speed. The sun gear shaft 10 rotates in a rotational speed the same as that of the second gear driven wheel 12. At this time, the power unit has been shifted from the zero gear to the second gear, thereby achieving a kinetic connection between the second gear driven wheel 12 and the synchronizer 8. Next, the power is transmitted to the planetary gear set 11 via the sun gear shaft 10, and finally the rotational speed is output by the planetary gear set 11.

Next, if the second gear magnetic unit 16 is powered off and the first gear magnetic unit 18 is powered on, the first gear magnetic unit 18 generates a magnetic force, and the shift fork 17 is attracted to move towards the first gear magnetic unit 18. The shift fork 17 drags the engaging sleeve 8-3 to move towards the first gear driving wheel 9 and the first gear driven wheel 14. During the movement of the shift fork 17, when the rotational speed output by the planetary gear set 11 is slightly decreased, it means that the power unit is in a zero gear state. Then, the shift fork 17 still drags the engaging sleeve 8-3 to move, and gradually connects with the first gear locking ring 8-6 during the movement of the engaging sleeve 8-3. After the first gear locking conical teeth 8-7 is connected with the first gear driven wheel 12, the first gear locking conical teeth 8-7 obtains the same rotational speed as the first gear driven wheel 12. There is a friction conical surface between the first gear locking conical tooth 8-7 and the first gear locking ring 8-6. During the gradual connection between the engaging sleeve 8-3 and the first gear locking ring 8-6, due to a pulling force of the first gear magnetic unit 18 on the shift fork 17, the connection between the first gear locking conical tooth 8-7 and the first gear locking ring 8-6 is gradually tight, so that the first gear locking ring 8-6 gradually speeding up rotation till its rotational speed is the same as that of the first gear locking conical tooth 8-7. In this process, the engaging sleeve 8-3 and the locking ring 8-6 rotate synchronously due to a friction force and gradually reach the same speed. The sun gear shaft 10 rotates in a rotational speed the same as that of the first gear driven wheel 14. At this time, the power unit has been shifted from the second gear to the first gear, thereby achieving a kinetic connection between the first gear driven wheel 14 and the synchronizer 8. Next, the power is transmitted to the planetary gear set 11 via the sun gear shaft 10, and finally the rotational speed is output by the planetary gear set 11.

The planetary gear set 11 of the embodiment of the present disclose may be a set of gears, including a sun gear, a plurality of planetary gears, an inner gear ring, and related planetary gear carrier. The sun gear is mounted on the sun gear shaft 10, and several planetary gears are evenly disposed between the sun gear and the inner gear ring. Several planetary gears are connected to the planetary gear carrier, and finally the planetary gear carrier outputs power.

The power unit of the embodiment of the present disclosure can achieve the following advantageous effects:

1. Since the second driving wheels and the second driven wheels are adopted in the power unit, the problem that the motor in the joint of the conventional bionic robot cannot change its speed and the gear ratio is simplex is effectively solved, thereby achieving the technical effect of changing the output rotational speed of the power unit by changing the gear ratio inside the power unit.

2. Since the needle roller bearing is adopted in the power unit in some embodiments, the problem that the ball bearing has a small load bearing capacity after the volume of the power unit is decreased is effectively solved, thereby achieving the technical effect of maintaining the load bearing capacity of the bearing while decreasing the volume of the power unit.

3. Since the shift fork, the second gear magnetic unit and the first gear magnetic unit are adopted in the power unit in some embodiments, the problem that the power unit needs manual shifting and the shifting speed is slow is effectively solved, thereby achieving the technical effect of fast shifting and automatic shifting.

Although only some embodiments of the present disclosure has been described in detail as above, it is only some preferred embodiments of the present disclosure and should not be considered as a limitation to the scope of the present disclosure. Any equivalent change, improvement, etc. made in accordance with the protection scope of the present disclosure should still fall within the patent coverage scope of the present disclosure.

The invention claimed is:

1. A power unit for a bionic robot, comprising: a motor shell, wherein a motor stator is embedded in the motor shell, a motor rotor is embedded in the motor stator, a motor rotor shaft is embedded in the motor rotor, bearings are disposed between the motor rotor shaft and the motor shell, a driving shaft is embedded in a central portion of the motor rotor shaft, a first driving wheel is disposed on the driving shaft, two transmission shafts are disposed in the motor rotor shaft, a first driven wheel and second driving wheels are disposed on each of the transmission shafts, the first driven wheel is engaged with the first driving wheel, a sun gear shaft is further disposed in the motor rotor shaft, the sun gear shaft and the driving shaft are coaxially disposed, a synchronizer and second driven wheels are disposed on the sun gear shaft, the second driven wheels are engaged with the second driving wheels, and a planetary gear set is further disposed on the sun gear shaft;

the second driving wheels comprise a first gear driving wheel and a second gear driving wheel, the second driven wheels comprises a first gear driven wheel and a second gear driven wheel, the first gear driving wheel is engaged with the first gear driven wheel, and the second gear driving wheel is engaged with the second gear driven wheel; the first gear driving wheel and the second gear driving wheel have different radiuses;

the synchronizer is disposed in the motor rotor shaft and between the second gear driven wheel and the first gear driven wheel, for selective kinetic connection with the second gear driven wheel or the first gear driven wheel to achieve a synchronous movement with the second gear driven wheel or the first gear driven wheel;

the synchronizer is in a splined connection with the sun gear shaft;

the two transmission shafts form two transmission paths for power dividing by the first driven wheel on each of the transmission shafts engaging with the first driving wheel and the second driving wheel on each of the transmission shafts engaging with corresponding second driven wheel, so that power from the driving shaft is transmitted by the two transmission shafts, and then is converged to the sun gear shaft.

2. The power unit for a bionic robot according to claim 1, wherein,
in a state where the synchronizer is in kinetic connection with the first gear driven wheel, an output gear of the power unit is a first gear;
in a state where the synchronizer is in kinetic connection with the second gear driven wheel, an output gear of the power unit is a second gear.

3. The power unit for a bionic robot according to claim 1, wherein a second needle roller bearing is disposed between the second gear driven wheel and the sun gear shaft, and a first needle roller bearing is disposed between the first gear driven wheel and the sun gear shaft.

4. The power unit for a bionic robot according to claim 1, wherein the synchronizer comprises a splined hub sleeved on the sun gear shaft, the splined hub is sleeved with an engaging sleeve, a locating pin is disposed between the engaging sleeve and the splined hub, second gear locking conical teeth and first gear locking conical teeth are symmetrically disposed on left and right sides of the splined hub, the second gear locking conical teeth are sleeved with a second gear locking ring, and the first gear locking conical teeth is sleeved with a first gear locking ring.

5. The power unit for a bionic robot according to claim 4, wherein rectangular splines are disposed through side surfaces of the splined hub.

6. The power unit for a bionic robot according to claim 4, wherein guide angles are provided on the second gear locking conical tooth, the second gear locking ring, the first gear locking conical tooth, and the first gear locking ring.

7. The power unit for a bionic robot according to claim 4, wherein a shift fork is disposed on the engaging sleeve, and a second gear magnetic unit and a first gear magnetic unit are symmetrically disposed on left and right sides of the shift fork.

8. A robot joint comprising a power unit, wherein the power unit comprises a motor shell in which a motor stator is embedded, a motor rotor is embedded in the motor stator, a motor rotor shaft is embedded in the motor rotor, bearings are disposed between the motor rotor shaft and the motor shell, a driving shaft is embedded in a central portion of the motor rotor shaft, a first driving wheel is disposed on the driving shaft, two transmission shafts are disposed in the motor rotor shaft, a first driven wheel and second driving wheels are disposed on each of the transmission shafts, the first driven wheel is engaged with the first driving wheel, a sun gear shaft is further disposed in the motor rotor shaft, the sun gear shaft and the driving shaft are coaxially disposed, a synchronizer and a second driven wheels are disposed on the sun gear shaft, the second driven wheels are engaged with the second driving wheels, and a planetary gear set is further disposed on the sun gear shaft;
the second driving wheels comprise a first gear driving wheel and a second gear driving wheel, the second driven wheels comprise a first gear driven wheel and a second gear driven wheel, the first gear driving wheel is engaged with the first gear driven wheel, and the second gear driving wheel is engaged with the second gear driven wheel; the first gear driving wheel and the second gear driving wheel have different radiuses;
the synchronizer is disposed in the motor rotor shaft and between the second gear driven wheel and the first gear driven wheel, for selective kinetic connection with the second gear driven wheel or the first gear driven wheel to achieve a synchronous movement with the second gear driven wheel or the first gear driven wheel;
the synchronizer is in a splined connection with the sun gear shaft;
the two transmission shafts form two transmission paths for power dividing by the first driven wheel on each of the transmission shafts engaging with the first driving wheel and the second driving wheel on each of the transmission shafts engaging with corresponding second driven wheel, so that power from the driving shaft is transmitted by the two transmission shafts, and then is converged to the sun gear shaft.

9. The robot joint according to claim 8, wherein a second needle roller bearing is disposed between the second gear driven wheel and the sun gear shaft, and a first needle roller bearing is disposed between the first gear driven wheel and the sun gear shaft.

10. The robot joint according to claim 8, wherein the synchronizer comprises a splined hub sleeved on the sun gear shaft, the splined hub is sleeved with an engaging sleeve, a locating pin is disposed between the engaging sleeve and the splined hub, second gear locking conical teeth and first gear locking conical teeth are symmetrically disposed on left and right sides of the splined hub, the second gear locking conical teeth are sleeved with a second gear locking ring, and the first gear locking conical teeth is sleeved with a first gear locking ring.

11. The robot joint according to claim 10, wherein rectangular splines are disposed through side surfaces of the splined hub.

12. The robot joint according to claim 10, wherein guide angles are provided on the second gear locking conical tooth, the second gear locking ring, the first gear locking conical tooth, and the first gear locking ring.

13. The robot joint according to claim 10, wherein a shift fork is disposed on the engaging sleeve, and a second gear magnetic unit and a first gear magnetic unit are symmetrically disposed on left and right sides of the shift fork.

14. A robot comprising a robot joint that comprises a power unit, wherein the power unit comprises a motor shell in which a motor stator is embedded, a motor rotor is embedded in the motor stator, a motor rotor shaft is embedded in the motor rotor, bearings are disposed between the motor rotor shaft and the motor shell, a driving shaft is embedded in a central portion of the motor rotor shaft, a first driving wheel is disposed on the driving shaft, two transmission shafts are disposed in the motor rotor shaft, a first driven wheel and second driving wheels are disposed on each of the transmission shafts, the first driven wheel is engaged with the first driving wheel, a sun gear shaft is further disposed in the motor rotor shaft, the sun gear shaft and the driving shaft are coaxially disposed, a synchronizer and a second driven wheels are disposed on the sun gear shaft, the second driven wheels are engaged with the second driving wheels, and a planetary gear set is further disposed on the sun gear shaft;
the second driving wheels comprise a first gear driving wheel and a second gear driving wheel, the second driven wheels comprise a first gear driven wheel and a second gear driven wheel, the first gear driving wheel is engaged with the first gear driven wheel, and the second gear driving wheel is engaged with the second gear driven wheel; the first gear driving wheel and the second gear driving wheel have different radiuses;
the synchronizer is disposed in the motor rotor shaft and between the second gear driven wheel and the first gear driven wheel, for selective kinetic connection with the second gear driven wheel or the first gear driven wheel to achieve a synchronous movement with the second gear driven wheel or the first gear driven wheel;

the synchronizer is in a splined connection with the sun gear shaft;

the two transmission shafts form two transmission paths for power dividing by the first driven wheel on each of the transmission shafts engaging with the first driving wheel and the second driving wheel on each of the transmission shafts engaging with corresponding second driven wheel, so that power from the driving shaft is transmitted by the two transmission shafts, and then is converged to the sun gear shaft.

15. The robot according to claim 14, wherein a second needle roller bearing is disposed between the second gear driven wheel and the sun gear shaft, and a first needle roller bearing is disposed between the first gear driven wheel and the sun gear shaft.

16. The robot according to claim 14, wherein the synchronizer comprises a splined hub sleeved on the sun gear shaft, the splined hub is sleeved with an engaging sleeve, a locating pin is disposed between the engaging sleeve and the splined hub, second gear locking conical teeth and first gear locking conical teeth are symmetrically disposed on left and right sides of the splined hub, the second gear locking conical teeth are sleeved with a second gear locking ring, and the first gear locking conical teeth is sleeved with a first gear locking ring.

17. The robot according to claim 16, wherein rectangular splines are disposed through side surfaces of the splined hub.

18. The robot according to claim 16, wherein guide angles are provided on the second gear locking conical tooth, the second gear locking ring, the first gear locking conical tooth, and the first gear locking ring.

19. The robot according to claim 16, wherein a shift fork is disposed on the engaging sleeve, and a second gear magnetic unit and a first gear magnetic unit are symmetrically disposed on left and right sides of the shift fork.

* * * * *